(12) United States Patent
Kim

(10) Patent No.: US 10,361,571 B2
(45) Date of Patent: Jul. 23, 2019

(54) BATTERY PACK

(71) Applicant: SAMSUNG SDI CO., LTD., Yongin-si, Gyeonggi-do (KR)

(72) Inventor: Dukjung Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 94 days.

(21) Appl. No.: 15/728,717

(22) Filed: Oct. 10, 2017

(65) Prior Publication Data

US 2018/0123363 A1 May 3, 2018

(30) Foreign Application Priority Data

Nov. 2, 2016 (KR) ........................ 10-2016-0145181

(51) Int. Cl.
*H02J 7/00* (2006.01)
*H01M 10/615* (2014.01)
*B60L 1/02* (2006.01)
*B60L 58/27* (2019.01)
*H01M 10/42* (2006.01)
*H01M 10/46* (2006.01)

(52) U.S. Cl.
CPC .............. *H02J 7/0029* (2013.01); *B60L 1/02* (2013.01); *B60L 58/27* (2019.02); *H01M 10/425* (2013.01); *H01M 10/46* (2013.01); *H01M 10/615* (2015.04); *H02J 7/0063* (2013.01); *B60L 2240/545* (2013.01); *H01M 2010/4271* (2013.01); *H02J 2007/0067* (2013.01)

(58) Field of Classification Search
CPC .................. H02J 7/0029; H02J 7/0063; H02J 2007/0067; B60L 58/27; B60L 1/02; B60L 2240/545; H01M 10/46; H01M 10/425; H01M 10/615; H01M 2010/4271
USPC ........................................................ 320/135
See application file for complete search history.

(56) References Cited

U.S. PATENT DOCUMENTS

| | | | | |
|---|---|---|---|---|
| 4,442,804 A * | 4/1984 | Morgan | ................... | F02P 19/02 123/145 A |
| 6,031,355 A * | 2/2000 | Rich | ................. | H01M 10/0445 320/117 |
| 6,966,803 B2 * | 11/2005 | Hara | ........................ | B60K 6/48 440/6 |
| 7,262,950 B2 * | 8/2007 | Suzuki | ................... | H01H 47/04 361/139 |
| 7,688,023 B2 * | 3/2010 | Yoon | ................... | H01M 10/441 320/104 |
| 8,212,571 B2 * | 7/2012 | Emori | ................... | H02J 7/0018 324/522 |

(Continued)

FOREIGN PATENT DOCUMENTS

JP 2007-242247 A 9/2007
JP 2015-154585 A 8/2015

*Primary Examiner* — M Baye Diao
(74) *Attorney, Agent, or Firm* — Lee & Morse, P.C.

(57) ABSTRACT

A battery pack includes first and second main relays connected between respective terminals of the battery and a load, a temperature variable resistor connected in parallel to the second main relay, a heating coil adjacent to the temperature variable resistor, and first and second switches respectively connected between a power source and coils of the first and second main relays. A third switch is connected between the power source and the heating coil. A controller to control on/off states of the first, second, and third switches.

13 Claims, 6 Drawing Sheets

(56) References Cited

U.S. PATENT DOCUMENTS

| | | | |
|---|---|---|---|
| 8,643,335 B2* | 2/2014 | Arakawa | H01M 2/204 180/65.1 |
| 8,816,631 B2* | 8/2014 | Wei | H02J 9/005 318/400.3 |
| 9,333,874 B2* | 5/2016 | Kubo | B60L 11/1879 |
| 9,627,719 B2* | 4/2017 | Jung | H01M 10/44 |
| 9,673,695 B1* | 6/2017 | Li | H02M 7/125 |
| 9,923,410 B2* | 3/2018 | Schaedlich | B60L 3/0038 |
| 9,925,933 B2* | 3/2018 | Hartl | B60R 16/02 |
| 9,931,949 B2* | 4/2018 | Loftus | B60L 58/12 |
| 10,076,964 B2* | 9/2018 | Hong | B60L 11/18 |
| 10,116,154 B2* | 10/2018 | Kim | H02J 7/0052 |
| 2013/0207461 A1* | 8/2013 | Huh | B60R 16/03 307/10.1 |
| 2017/0028857 A1* | 2/2017 | Gonzales | B60L 11/1809 |

* cited by examiner

BATTERY PACK

CROSS-REFERENCE TO RELATED APPLICATION

Korean Patent Application No. 10-2016-0145181, filed on Nov. 2, 2016, and entitled, "Battery Pack," is incorporated by reference herein in its entirety.

BACKGROUND

1. Field

One or more embodiments described herein relate to a battery pack.

2. Description of the Related Art

In many countries, $CO_2$ and other environmental regulations have been established for governing the operation of vehicles. Accordingly, vehicle companies have been actively researching and developing pure electrical vehicles and hydrogen vehicles, in addition to hybrid and plug-in hybrid vehicles.

Some of these so-called environmentally-friendly vehicles are equipped with a high-voltage electric system, which may use high-voltage electrical energy from a high voltage battery to drive the vehicle or to meet other electrical requirements.

In a high voltage electric system, in-rush current may be generated when a load is connected to the battery in series and a voltage difference between a capacitor of the load and a voltage at the high voltage battery is substantial. The in-rush current is a high current that may flow to a relay to fix the relay or to the battery. The in-rush current may also severely damage a high voltage circuit resulting in a fire.

SUMMARY

In accordance with one or more embodiments, a battery pack includes a battery, first and second main relays connected between respective terminals of the battery and a load, a pre-charge circuit including a pre-charge resistor and a pre-charge relay connected in series and connected in parallel to the second main relay, a first switch connected between a power source and a coil of the first main relay, the first switch to transmit a voltage of the power source to the coil of the first main relay, a second switch connected between the first switch and coils of the second main relay and the pre-charge relay, the second switch to transmit the voltage of the power source transmitted through the first switch to the coil of the second main relay or the coil of the pre-charge relay, a first capacitor connected between the second switch and the coil of the pre-charge relay, and a controller to control switching of the first and second switches.

The battery pack may include a second capacitor connected between the second switch and the coil of the second main relay. When a pre-charge is requested, the controller may turn on the first switch and control the second switch so that the first switch may be conductive to the coil of the pre-charge relay. When the pre-charge is finished, the controller may control the second switch so that the first switch may be conductive to the coil of the second main relay. The power source may include the battery, and the battery pack may include a voltage converter to reduce a pack voltage of the battery and to transmit the reduced pack voltage to the first switch.

In accordance with one or more other embodiments, a battery pack includes a battery, first and second main relays connected between respective terminals of the battery and a load, a temperature variable resistor connected in parallel to the second main relay, a heating coil adjacent to the temperature variable resistor, first and second switches respectively connected between a power source and coils of the first and second main relays, a third switch connected between the power source and the heating coil, and a controller to control on/off states of the first, second, and third switches. The controller may turn on the first and third switches when a pre-charge is requested and turn on the second switch and turns off the third switch when the pre-charge is finished.

In accordance with one or more other embodiments, a battery pack includes a battery, first and second main relays connected between respective terminals of the battery and a load, a temperature variable resistor connected in series between the second main relay and the load, a heating coil adjacent to the temperature variable resistor, first and second switches respectively connected between a power source and coils of the first and second main relays, a third switch connected between the power source and the heating coil, and a controller to control on/off states of the first, second, and third switches. The controller may maintain the first and third switches at the on state for a predetermined time and may turn on the second switch and turn off the third switch thereafter.

In accordance with one or more other embodiments, an apparatus includes an interface and a controller to output one or more signals through the interface to delay a rate of flow of current from a battery to a load by a predetermined time, the one or more signals to control at least one switch to establish a delay path to generate the delay in the rate of current flow. The delay in the rate of current flow may reduce a rate of in-rush current to a load powered by a battery. The one or more signals may include a first signal to control switching of a first switch connected between a power source and a coil of a first main relay, and a second signal to control switching of a second switch connected between the first switch and at least one coil of a second main relay and a pre-charge relay, the pre-charge relay connected to a pre-charge resistor and the second switch connected to a coil of the pre-charge relation through a capacitor. The controller may output the first signal through the interface for a pre-charge operation. The controller may control the second switch so that the first switch may be conductive to the coil of the second main relay when the pre-charge operation is finished.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
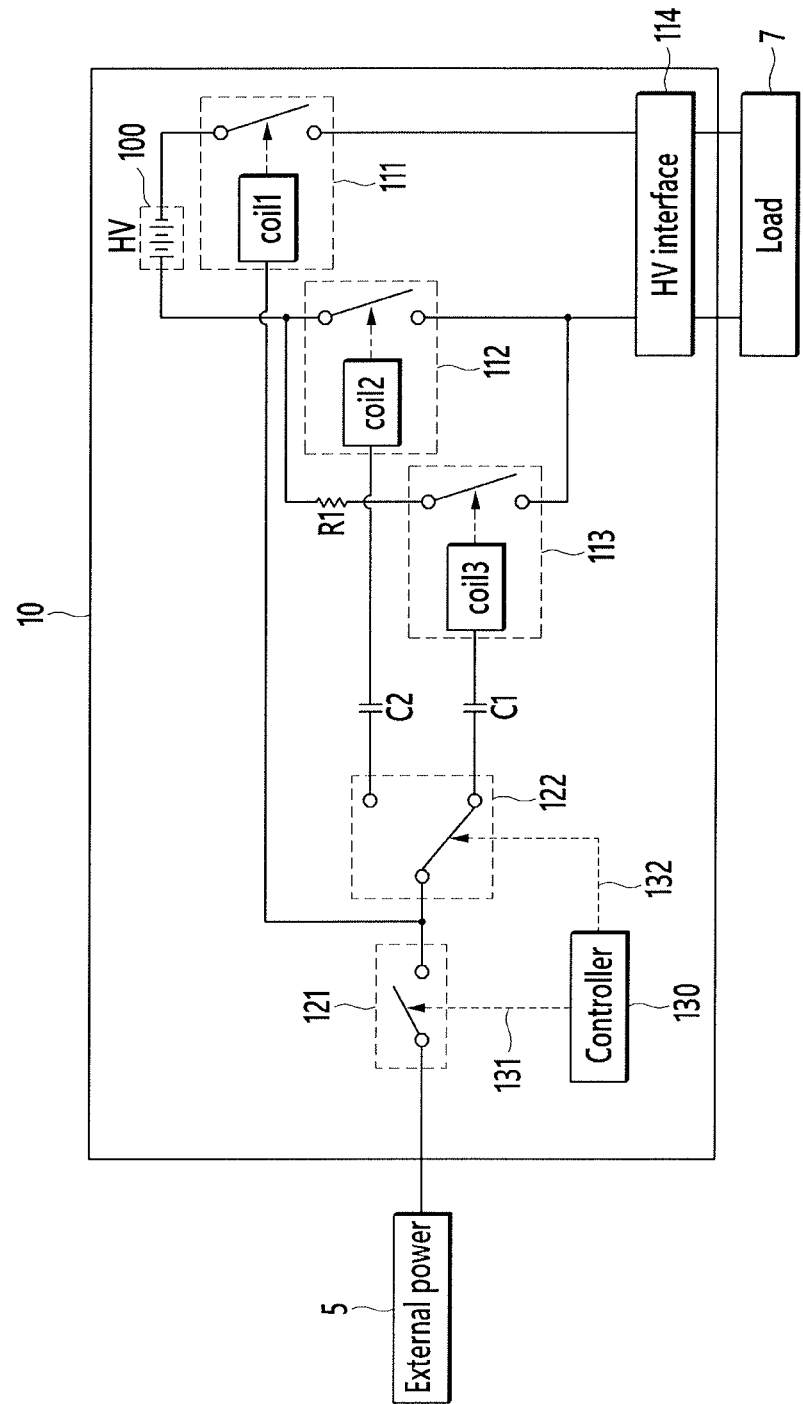
FIG. 1 illustrates an embodiment of a battery pack.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
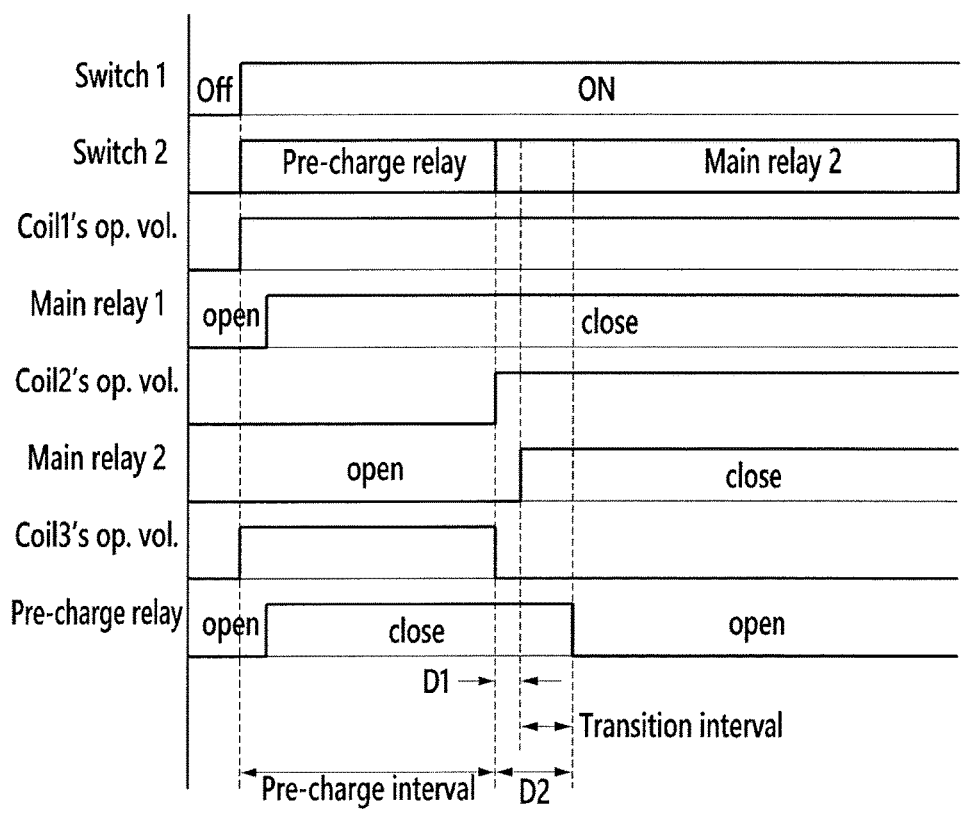
FIG. 2 illustrates a driving timing embodiment to control in-rush current.

FIG. 1 illustrates an embodiment of a battery pack 10, and FIG. 2 illustrates an embodiment of driving timing for controlling in-rush current in the battery pack 10.

Referring to FIG. 1, the battery pack 10 includes a battery 100, a plurality of main relays 111 and 112, a pre-charge relay 113, a pre-charge resistor R1, and a high voltage (HV) interface 114. The battery 100 may be a high voltage battery or another type of battery. The main relays 111 and 112 are connected between respective terminals of the battery 100 and the high voltage interface 114 respectively and control current flow between the battery 100 and the high voltage interface 114. The pre-charge relay 113 is coupled in series to the pre-charge resistor R1. The pre-charge relay 113 and pre-charge resistor R1 are coupled in parallel to one relay 112 of main relays 111 and 112.

When the main relays 111 and 112 are directly connected to the load 7, an in-rush current flow is generated. The in-rush current may fix the main relays 111 and 112 and/or damage a capacitor of the load 7.

The pre-charge relay 113 delays an increase of voltage at the capacitor and controls the in-rush current. The pre-charge resistor R1 controls the flow of in-rush current together with the pre-charge relay 113. Resistance of the pre-charge resistor R1 may be designed, for example, based on the size of current flowing through the load 7.

The main relays 111 and 112 and pre-charge relay 113 include coils (coil1, coil2, and coil3) for performing a switching operation. The relays 111, 112, and 113 are opened or closed when a node operates based on a voltage supplied to the coils (coil1, coil2, and coil3).

The battery pack 10 further includes first and second switches 121 and 122 for controlling the opening and closing of the relays 111, 112, and 113. The first switch 121 includes an input terminal connected to an external power source 5, and an output terminal connected to the coil (coil1) of the first main relay 111 and the second switch 122. The first switch 121 transmits the voltage supplied by the external power source 5 to the coil (coil1) of the first main relay 111 and second switch 122 or blocks the same. The switching operation of the first switch 121 is controlled by a controller 130.

The second switch 122 includes an input terminal connected to an output terminal of the first switch 121, a first output terminal connected to the coil (coil2) of the second main relay 112, and a second output terminal connected to the coil (coil3) of the pre-charge relay 123. The second switch 122 transmits the voltage transmitted through the first switch 121 to one of the coil (coil2) of the second main relay 112 and the coil (coil3) of the pre-charge relay 113. The switching operations of the first and second switches 121 and 122 are controlled by the controller 130.

The battery pack 10 may further include a capacitor C1 connected between the second output terminal of the second switch 122 and the coil (coil3) of the pre-charge relay 113. The capacitor C1 is charged while an operating voltage is supplied to the coil (coil3) of the pre-charge relay 113 through the second switch 122. When the input terminal of the second switch 122 is connected to the first output terminal, the capacitor C1 outputs the charged voltage to the coil (coil3) of the pre-charge relay 113, in order to maintain the pre-charge relay 113 at a closed state for a predetermined time.

According to characteristics of the relay, a predetermined time delay (e.g., D1 in FIG. 2) occurs until the second switch 122 is closed by an electromotive force of the coil (coil2). The predetermined time delay begins at a time when a voltage starts to be applied to the coil (coil2) by the switching operation of the second switch 122. The second switch 122 is not instantly closed while the pre-charge relay 113 is opened after the pre-charge operation. As a result, an in-rush current may be generated when the second switch 122 is closed.

Therefore, the battery pack uses the capacitor C1 to control the pre-charge relay 113 to be opened after a predetermined time (e.g., D2 in FIG. 2), from the time when the voltage begins to be applied to the coil (coil2) of the second switch 122 after the pre-charge operation.

The battery pack 10 may further include a capacitor C2 connected between a second output terminal of the first switch 122 and the second main relay 112. The capacitor C2 is charged while the voltage is applied to the coil (coil2) of the second main relay 112 through the second switch 122. When the second switch 122 is opened, the charged current is discharged to the coil (coil2) of the second main relay 112 to maintain the second main relay 112 at the closed state for a predetermined time.

The controller 130 controls the first and second switches 121 and 122, in order to control application of operational power voltage to the coils (coil1, coil2, and coil3) of the relays 111, 112, and 113.

Referring to FIG. 2, when a pre-charge operation for connecting the battery 100 to the load 7 is requested, the controller 130 outputs a signal to turn on the first switch 121 so that current applied by the external power source 5 may be transmitted to the second switch 122. The controller 130 outputs a signal to control the second switch 122 to start pre-charge, so that the input terminal of the second switch 122 may conduct with the second output terminal, that is, the pre-charge relay 113.

When the first switch 121 is turned on, the voltage is applied to the coil (coil1) of the first main relay 111. As a result, the first main relay 111 is closed. According to characteristics of the relay, a predetermined time delay may be generated until the first main relay 111 is closed from the time when the voltage begins to be applied to the coil (coil1) of the first main relay 111.

As the first switch 121 is turned on and the input terminal of the second switch 122 is connected to the coil (coil3) of the pre-charge relay 113, the operating voltage begins to be supplied to the coil (coil3) of the pre-charge relay 113.

When the voltage is applied to the coil (coil3) of the pre-charge relay 113, a node at the pre-charge relay 113 operates to close the pre-charge relay 113. The pre-charge relay 113 is also closed (according to characteristics of the relay) after a predetermined time when the voltage starts being applied to the coil (coil3). When the pre-charge relay 113 is closed, the capacitor on the side of the load 7 may be charged through a pre-charge path formed by the first main relay 111, the pre-charge relay 113, and the pre-charge resistor R1.

The controller 130 switches the input terminal of the second switch 122 to the second main relay 112 when a predetermined time (e.g., a pre-charge interval) passes, after pre-charge begins (e.g., after first switch 121 is turned on and the input terminal of the second switch 122 is connected to the coil (coil3) of the pre-charge relay 113). The pre-charge interval may be established by capacitance of the capacitor of the load 7 and a control integer according to the capacitance of the capacitor C1.

When the input terminal of the second switch 122 is switched to the second main relay 112, the operating voltage starts to be supplied to the coil (coil2) of the second main relay 112.

When the voltage is applied to the coil (coil2) of the second main relay 112, the node at the second main relay 112 operates to shut the second main relay 112. The second main relay 112 is closed after a predetermined time D1 when the voltage begins to be applied to the coil (coil2) according to characteristics of the relay. When the second main relay 112 is closed, the load 7 may receive a power voltage through a current path formed by the first main relay 111 and the second main relay 112.

When the input terminal of the second switch 122 is switched to the second main relay 112, the coil (coil3) of the pre-charge relay 113 may receive the operating voltage for a predetermined time D2 by the capacitor C1. Therefore, the pre-charge relay 113 maintains the closed state for a predetermined time after the input terminal of the second switch 122 is switched to the second main relay 112. A transition interval corresponds to a state in which the pre-charge relay 113 and the second main relay 112 are simultaneously closed.

For this purpose, the capacitance of the capacitor C1 may maintain the pre-charge relay 113 at the closed state until the voltage is applied to the coil (coil2) of the second main relay 112 to shut the second main relay 112.

The controller 130 may monitor the switching timing of the second switch 122 to perform a safety diagnosis. For example, when the time until the second switch 122 is switched to the second main relay 112 after the pre-charge starts is less than a first threshold time, controller 130 may extend the pre-charge time, by switching the second switch 122 again to the pre-charge relay 113, to sufficiently charge the capacitor on the side of the load 7.

In addition, controller 130 may, for example, turn off the first switch 121 to open the relays 111, 112, and 113 when the time (until the second switch 122 is switched to the second main relay 112 after the pre-charge starts) is less than a second threshold time. The second threshold time may be shorter than the first threshold time, and may correspond, for example, to a pre-charge time in which generation of in-rush current is expected, since the pre-charge interval is very short.

The external power 5 may be supplied from a system (e.g., a vehicle system) in which the battery pack 10 is installed.

FIG. 1 illustrates the case of using the external power source 5 as an operational power voltage of the relays 111, 112, and 113. In one embodiment, a pack voltage of the battery 100 (which is different from the external power source 5) may be supplied as the operational power voltage of the relays 111, 112, and 113. In this case, a voltage converter, for example, which converts the high-voltage pack voltage of the battery 100 to a low voltage may be connected between the battery 100 and the first switch 121.

Figure 3:
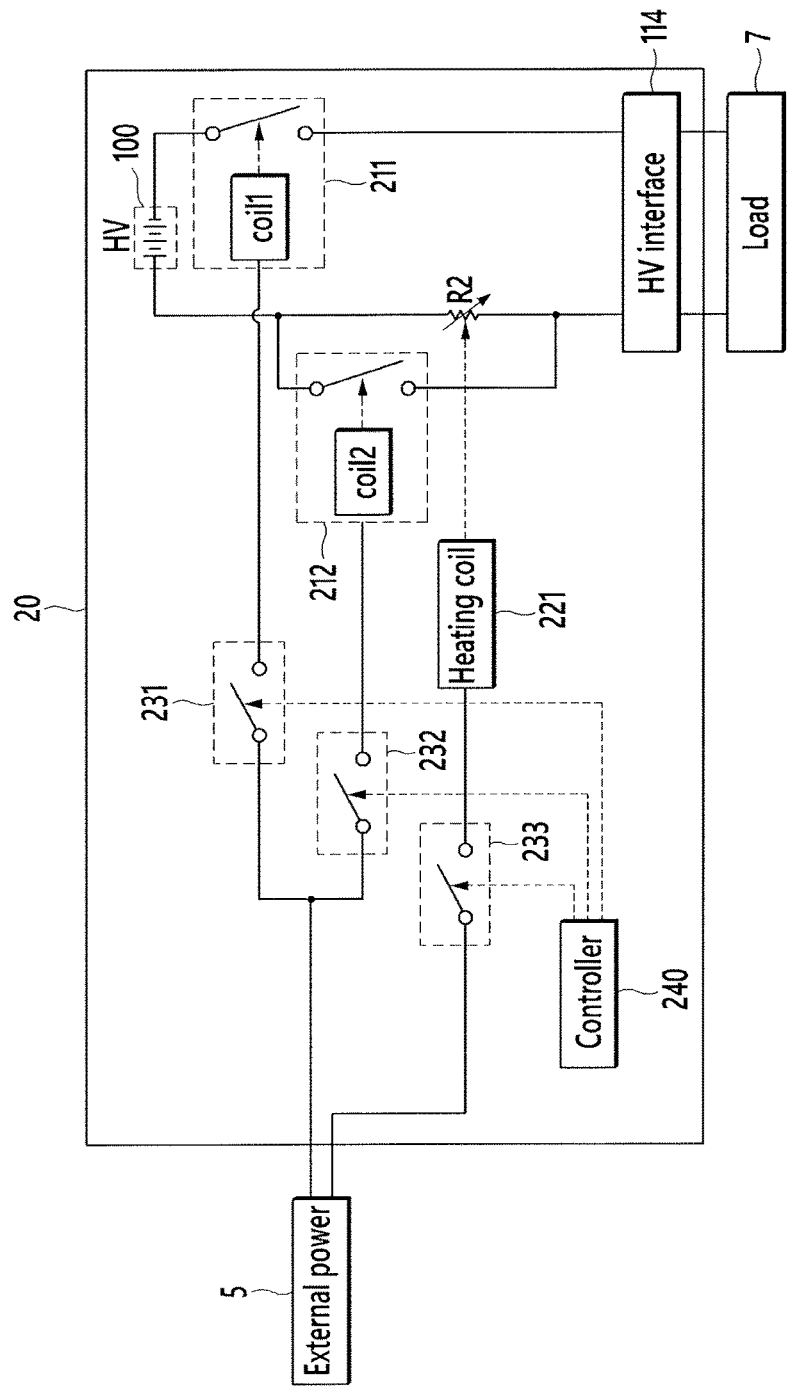
FIG. 3 illustrates another embodiment of a battery pack.
Figure 4:
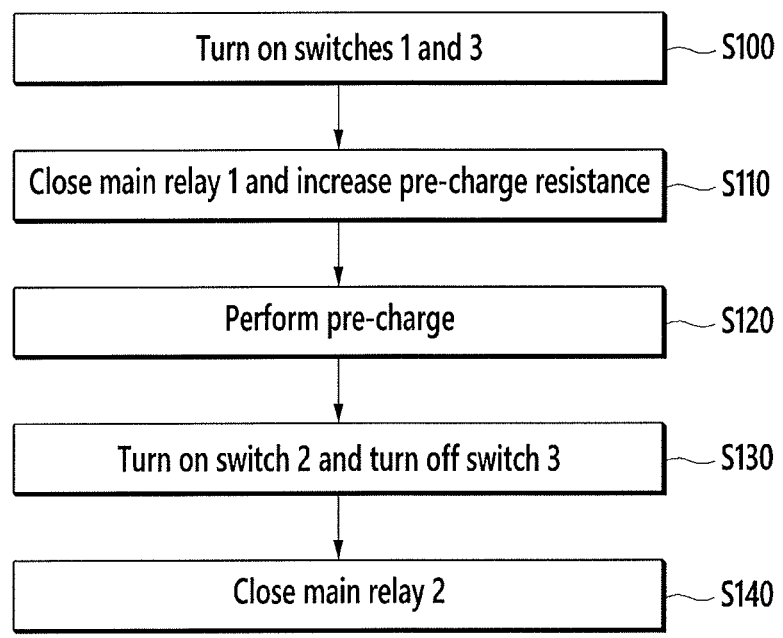
FIG. 4 illustrates an embodiment of a method for controlling in-rush current.

FIG. 3 illustrates another embodiment of a battery pack 20, and FIG. 4 illustrates an embodiment of a method for controlling in-rush current of battery pack 20.

Referring to FIG. 3, the battery pack 20 includes a battery 100, a plurality of main relays 211 and 212, a pre-charge resistor R2, and a high voltage interface 114. The main relays 211 and 212 are connected between respective terminals of the battery 100 and the high voltage interface 114, respectively, to control current flow between the battery 100 and the high voltage interface 114. The main relays 211 and 212 include coils (coil1 and coil2) for switching operations. The main relays 211 and 212 are opened or closed as nodes are operated based on voltages applied to the coils (coil1 and coil2).

The pre-charge resistor R2 is coupled in parallel to one relay 212 of the main relays 211 and 212 and is used to control the flow of in-rush current. The pre-charge resistor R2 may be a variable resistor, e.g., a resistor having variable resistance. The pre-charge resistor R2 may be a positive temperature coefficient (PTC) resistor, e.g., a temperature variable resistor having a resistance that varies with temperature. For example, the PTC resistor may be a resistor which has a resistance that increases as temperature increases.

FIG. 3 illustrates an embodiment in which the pre-charge resistor R2 is a PTC resistor. The pre-charge resistor R3 may use a resisting device using a stepping motor.

The battery pack 20 may include a heating coil 221, a plurality of switches 231, 232, and 233 for controlling a voltage supply to the coils (coil1, coil2, and 221, and a controller 240. The first switch 231 includes an input terminal connected to the external power source 5, and an output terminal connected to the coil (coil1) of the first main relay 211. The first switch 231 transmits the voltage supplied by the external power source 5 to the first main relay 211 or intercepts the same. A switching operation of the first switch 231 is controlled by the controller 240.

The second switch 232 includes an input terminal connected to the external power source 5, and an output terminal connected to the coil (coil2) of the second main relay 212. The second switch 232 transmits the voltage supplied by the external power source 5 to the second main relay 212 or intercepts the same. A switching operation of the second switch 232 is controlled by the controller 240.

The third switch 233 includes an input terminal connected to the external power source 5, and an output terminal connected to the heating coil 221. The third switch 233 transmits the voltage supplied by the external power source 5 to the heating coil 221 or intercepts the same. A switching operation of the third switch 233 is controlled by the controller 240. The heating coil 221 is near the pre-charge resistor R2 and generates heat to heat the pre-charge resistor R2 when the voltage is transmitted by third switch 233.

The controller 240 controls the switches 231, 232, and 233 in order to control the opening and closing of the main relays 211 and 212 and resistance of the pre-charge resistor R2.

Referring to FIG. 4, when a pre-charge is requested, the controller 240 turns on the first and third switches 231 and 233 to start a pre-charge (S100). When the first switch 231 is turned on, the voltage is supplied to the coil (coil1) of the first main relay 211, and as a result the first main relay 211 is shut. When the third switch 233 is turned on, current is applied to the heating coil 221 in order to heat the heating coil 221. As a result, the resistance of the pre-charge resistor R2 increases (S110).

When the first main relay 211 is closed, a pre-charge operation for charging the capacitor on the side of the load 7 is performed through a pre-charge path, formed with the first main relay 211 and the pre-charge resistor R2 (S120).

When a PTC resistor used as the pre-charge resistor R2, temperature increases when in-rush current flows. As a result, resistance increases. Therefore, the pre-charge resistor R2 increases the resistance to control the in-rush current transmitted to the load 7, when the in-rush current is input during the pre-charge operation.

When a predetermined time (e.g., a pre-charge interval) passes after the pre-charge starts (after the first switch 231 is turned on), the controller 240 turns on the second switch 232 (S130). Accordingly, the operating voltage is supplied to the coil (coil2) of the second main relay 212 and the second main relay 212 is shut (S140). When the second main relay 212 is closed, the load 7 may receive a power voltage through the current path formed by the first main relay 211 and second main relay 212.

FIG. 3 illustrates the case the operational power voltage of the main relays 211 and 212 and the heating coil 221 is supplied based on external power source 5. In one embodiment, the operational power voltage of the main relays 211 and 212 and the heating coil 221 may be supplied based on the pack voltage of the battery 100, not the external power source 5. In this case, a voltage converter for converting the high-voltage pack voltage of the battery 100 to a low voltage may be connected between the battery 100 and the switches 231, 232, and 233.

Figure 5:
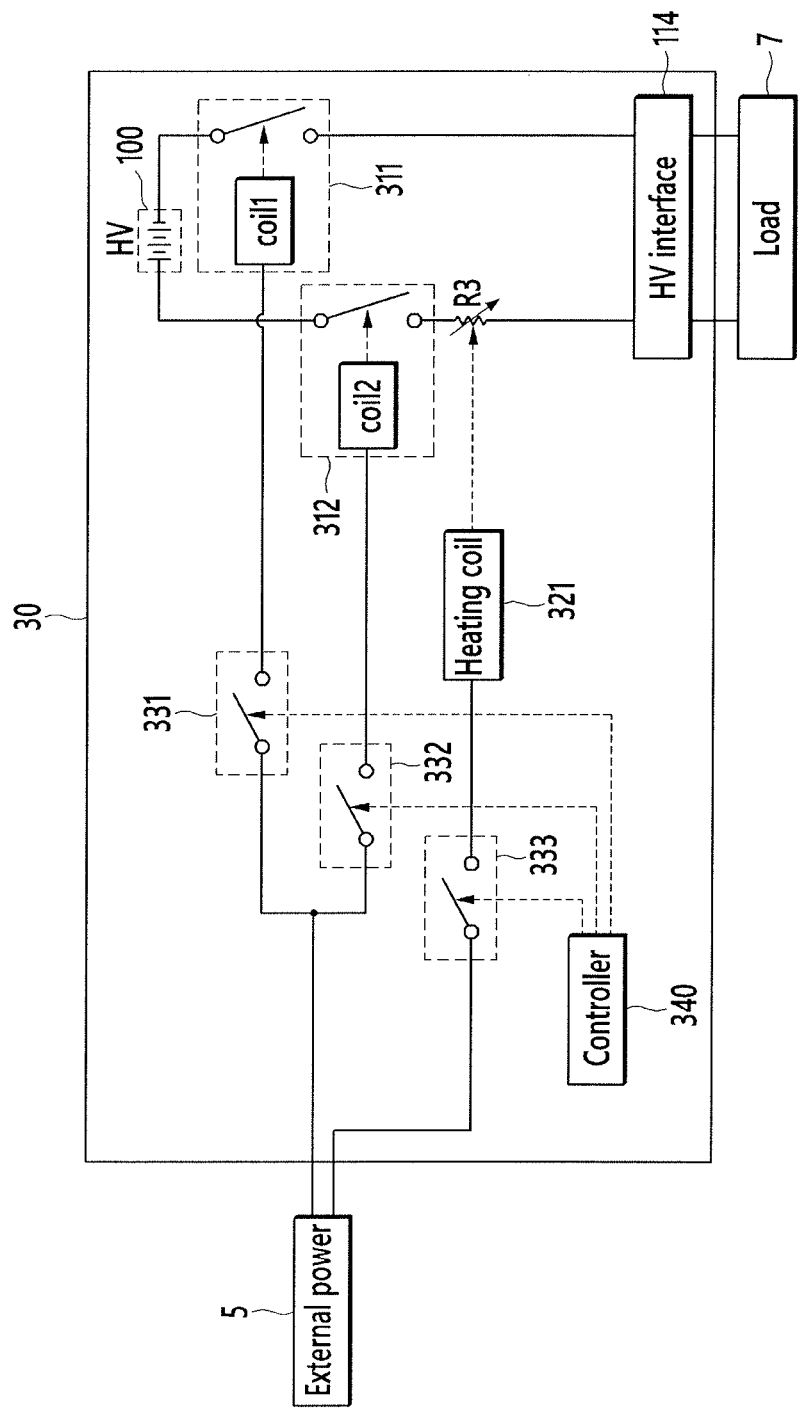
FIG. 5 illustrates another embodiment of a battery pack.
Figure 6:
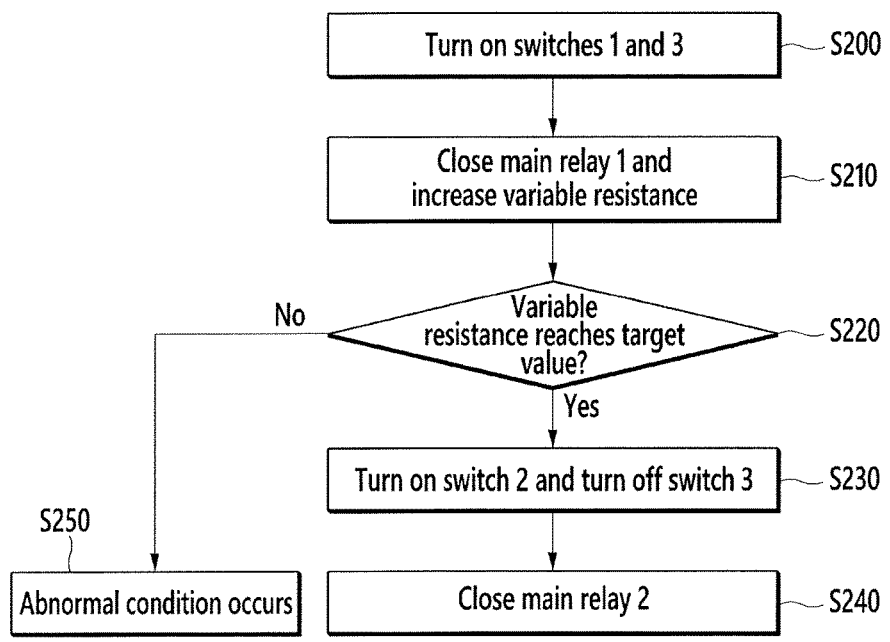
FIG. 6 illustrates another embodiment of a method for controlling in-rush current.

FIG. 5 illustrates another embodiment of a battery pack 30, and FIG. 6 illustrates an embodiment of a method for controlling in-rush current of battery pack 30.

Referring to FIG. 5, the battery pack 30 includes a battery 100, a plurality of main relays 311 and 312, a variable resistor R3, and a high voltage interface 114. The main relays 311 and 312 are connected between respective terminals of the battery 100 and the high voltage interface 114, respectively, to control current flow between the battery 100 and the high voltage interface 114.

The main relays 311 and 312 include coils (coil1 and coil2) for switching operations. The main relays 311 and 312 are opened or closed as nodes and are operated based on the voltages applied to the coils (coil1 and coil2).

The variable resistor R3 is coupled in parallel to one relay 312 of the main relays 311 and 312 and is used to control the flow of in-rush current. The variable resistor R3 may be, for example, a positive temperature coefficient (PTC) resistor, e.g., a temperature variable resistor having a resistance that varies with temperature. For example, the PTC resistor may have a resistance that increases as temperature increases. FIG. 5 illustrates the case in which the variable resistor R3 is a PTC resistor. In one embodiment, the variable resistor R3 may be a resisting device using a stepping motor.

The battery pack 20 may include a heating coil 321, a plurality of switches 331, 332, and 333 for controlling a voltage supply to the coils (coil1, coil2, and 321, and a controller 340. The first switch 331 includes an input terminal connected to the external power source 5, and an output terminal connected to the coil (coil1) of the first main relay 311. The first switch 331 transmits the voltage supplied by the external power source 5 to the first main relay 311 or intercepts the same. A switching operation of the first switch 331 is controlled by the controller 340.

The second switch 332 includes an input terminal connected to the external power source 5, and an output terminal connected to the coil (coil2) of the second main relay 312. The second switch 332 transmits the voltage supplied by the external power source 5 to the second main relay 312 or intercepts the same. A switching operation of the second switch 332 is controlled by the controller 340.

The third switch 333 includes an input terminal connected to the external power source 5, and an output terminal connected to the heating coil 321. The third switch 333 transmits the voltage supplied by the external power source 5 to the heating coil 321 or intercepts the same. A switching operation of the heating coil 321 is controlled by the controller 340. The heating coil 321 is near the variable resistor R3 and generates heat to heat the variable resistor R3 when the voltage is transmitted by the third switch 333.

The controller 340 controls the switches 331, 332, and 333 to control the opening and closing of the main relays 311 and 312 and resistance of the variable resistor R3.

Referring to FIG. 6, the controller 340 turns on the first and third switches 331 and 333 (S200). When the first switch 331 is turned on, the voltage is supplied to the coil (coil1) of the first main relay 311, and as a result the first main relay 311 is shut. When the third switch 333 is turned on, current is applied to the heating coil 321 to heat the heating coil 321. As a result, resistance of the variable resistor R3 increases (S210).

The controller 340 maintains the third switch 333 at the turned-on state for a predetermined time, in order to allow the resistance of the variable resistor R3 (for controlling in-rush current) to sufficiently increase before the current path is connected.

When the predetermined time passes, the controller 340 determines whether the resistance of the variable resistor R3 has reached a target value (S220).

When the resistance of the variable resistor R3 has reached a target value in the S220, the controller 340 turns on the second switch 332 and turns off the third switch 333 (S230).

Accordingly, the operating voltage is supplied to the coil (coil2) of the second main relay 312 and the second main relay 312 is shut (S240). When the second main relay 312 is closed, the load 7 may receive a power voltage through the current path formed by the first main relay 311 and the second main relay 312.

When the resistance of the variable resistor R3 has not reached a target value in the S220, it may be determined that an abnormal condition has occurred (S250).

FIG. 5 illustrates the case where the operational power voltage of the main relays 311 and 312 and the heating coil 321 is based on the external power source 5. In one embodiment, the operational power voltage of the main relays 311 and 312 and the heating coil 321 may be based on the pack voltage of the battery 100, not the external power source 5. In this case, a voltage converter for converting the high-voltage pack voltage of the battery 100 to a low voltage may be connected between the battery 100 and the switches 331, 332, and 333.

In accordance with one embodiment, an apparatus includes an interface and a controller to output one or more signals through the interface to delay a rate of flow of current from a battery to a load by a predetermined time, the one or more signals to control at least one switch to establish a delay path to generate the delay in the rate of current flow. The interface may be, for example, one or more signal lines, chip leads or ports, a software interface, or any other hardware or software for carrying signals. In FIG. 1, the interface may be signal lines 131 and 132. The controller may be any of the controllers described herein. For example, the controller may correspond to controller 130 in FIG. 1.

The delay in the rate of current flow reduces a rate of in-rush current to a load powered by a battery. The one or more signals include a first signal to control switching of a first switch connected between a power source and a coil of a first main relay, and a second signal to control switching of a second switch connected between the first switch and at least one coil of a second main relay and a pre-charge relay, the pre-charge relay connected to a pre-charge resistor and the second switch connected to a coil of the pre-charge relation through a capacitor. The controller may output the first signal through the interface for a pre-charge operation. The controller may control the second switch so that the first switch may be conductive to the coil of the second main relay when the pre-charge operation is finished.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The controllers and other signal generating and signal processing features of the embodiments may be implemented in logic which, for example, may include hardware, software, or both. When implemented at least partially in hardware, the controllers and other signal generating and signal processing features may be, for example, any of a variety of integrated circuits including but not limited to an application-specific integrated circuit, field-programmable gate array, a combination of logic gates, a system-on-chip, a microprocessor, or another type of processing or control circuit.

When implemented in at least partially in software, the controllers and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

In accordance with one or more of the aforementioned embodiments, the magnitude and/or rate of flow of in-rush current may be efficiently reduced or eliminated using a variable switch or a variable resistor. As a result, safety may be enhanced and control of in-rush current may be simplified.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A battery pack, comprising:
   a battery;
   first and second main relays connected between respective terminals of the battery and a load;
   a pre-charge circuit including a pre-charge resistor and a pre-charge relay connected in series to each other and in parallel to the second main relay;
   a first switch connected between a power source and a coil of the first main relay, the first switch to transmit a voltage of the power source to the coil of the first main relay;
   a second switch connected between the first switch and coils of the second main relay and the pre-charge relay, the second switch to transmit the voltage of the power source transmitted through the first switch to the coil of the second main relay or the coil of the pre-charge relay;
   a first capacitor connected between the second switch and the coil of the pre-charge relay; and
   a controller to control a switching of the first and second switches.

2. The battery pack as claimed in claim 1, further comprising:
   a second capacitor connected between the second switch and the coil of the second main relay.

3. The battery pack as claimed in claim 1, wherein:
   when a pre-charge operation is requested, the controller is to turn on the first switch and control the second switch so that the first switch may be conductive to the coil of the pre-charge relay.

4. The battery pack as claimed in claim 3, wherein:
   when the pre-charge operation is finished, the controller is to control the second switch so the first switch may be conductive to the coil of the second main relay.

5. The battery pack as claimed in claim 1, wherein:
   the power source includes the battery, and
   the battery pack includes a voltage converter to reduce a pack voltage of the battery and to transmit the reduced pack voltage to the first switch.

6. A battery pack, comprising:
   a battery;

first and second main relays connected between respective terminals of the battery and a load;

a temperature variable resistor connected in parallel to the second main relay;

a heating coil adjacent to the temperature variable resistor;

first and second switches respectively connected between a power source and coils of the first and second main relays;

a third switch connected between the power source and the heating coil; and a controller to control on/off states of the first, second, and third switches.

7. The battery pack as claimed in claim 6, wherein:
the controller is to turn on the first and third switches when a pre-charge is requested and to turn on the second switch and turns off the third switch when the pre-charge is finished.

8. A battery pack, comprising:
a battery;

first and second main relays connected between respective terminals of the battery and a load;

a temperature variable resistor connected in series between the second main relay and the load;

a heating coil adjacent to the temperature variable resistor;

first and second switches respectively connected between a power source and coils of the first and second main relays;

a third switch connected between the power source and the heating coil; and a controller to control on/off states of the first, second, and third switches.

9. The battery pack as claimed in claim 8, wherein:
the controller is to maintain the first and third switches at the on state for a predetermined time and then is to turn on the second switch and turn off the third switch.

10. An apparatus, comprising:
an interface; and a controller to output one or more signals through the interface to delay a rate of flow of current from a battery to a load by a predetermined time, the one or more signals to control at least one switch to establish a delay path to generate the delay in the rate of current flow, wherein the one or more signals include:

a first signal to control switching of a first switch connected between a power source and a coil of a first main relay, and a second signal to control switching of a second switch connected between the first switch and at least one coil of a second main relay and a pre-charge relay, the pre-charge relay connected to a pre-charge resistor and the second switch connected to a coil of the pre-charge relay through a capacitor.

11. The apparatus as claimed in claim 10, wherein the delay in the rate of current flow reduces a rate of in-rush current to a load powered by a battery.

12. The apparatus as claimed in claim 10, wherein the controller is to:
output the first signal through the interface for a pre-charge operation.

13. The apparatus as claimed in claim 12, wherein the controller is to control the second switch so that the first switch may be conductive to the coil of the second main relay when the pre-charge operation is finished.

* * * * *